(12) United States Patent
Heath et al.

(10) Patent No.: US 8,830,165 B1
(45) Date of Patent: Sep. 9, 2014

(54) USER INTERFACE

(75) Inventors: Taliver Brooks Heath, Mountain View, CA (US); Evan H. Parker, Atherton, CA (US)

(73) Assignee: Google Inc., Mountain View, CA (US)

( * ) Notice: Subject to any disclaimer, the term of this patent is extended or adjusted under 35 U.S.C. 154(b) by 262 days.

(21) Appl. No.: 13/356,728

(22) Filed: Jan. 24, 2012

(51) Int. Cl.
*G06F 17/28* (2006.01)

(52) U.S. Cl.
USPC .................................. 345/156; 704/4; 704/275

(58) Field of Classification Search
CPC .................................. G06F 17/28; G06F 15/16
USPC .......................................................... 345/156
See application file for complete search history.

(56) References Cited

U.S. PATENT DOCUMENTS

| | | | |
|---|---|---|---|
| 5,594,469 A | 1/1997 | Freeman et al. | |
| 6,009,210 A | 12/1999 | Kang | |
| 6,553,345 B1 * | 4/2003 | Kuhn et al. | 704/275 |
| 7,092,738 B2 | 8/2006 | Creamer et al. | |
| 8,296,151 B2 | 10/2012 | Klein et al. | |
| 2008/0250115 A1 * | 10/2008 | Iyer | 709/207 |
| 2009/0100383 A1 | 4/2009 | Sunday et al. | |
| 2010/0030549 A1 * | 2/2010 | Lee et al. | 704/4 |
| 2012/0236025 A1 | 9/2012 | Jacobsen et al. | |

* cited by examiner

*Primary Examiner* — Van Chow
(74) *Attorney, Agent, or Firm* — Fish & Richardson P.C.

(57) ABSTRACT

A method includes receiving a first input through a hands-based input device. A prompt is then output, and input responsive to the prompt may be received through either of a hands-based input device or a hands-free input device. Responsive to receiving a second input through a hands-free input device, a determination that the second input is responsive to the prompt may be made, an operation based on the second input may be performed, and cessation of the output of the prompt may occur.

21 Claims, 5 Drawing Sheets

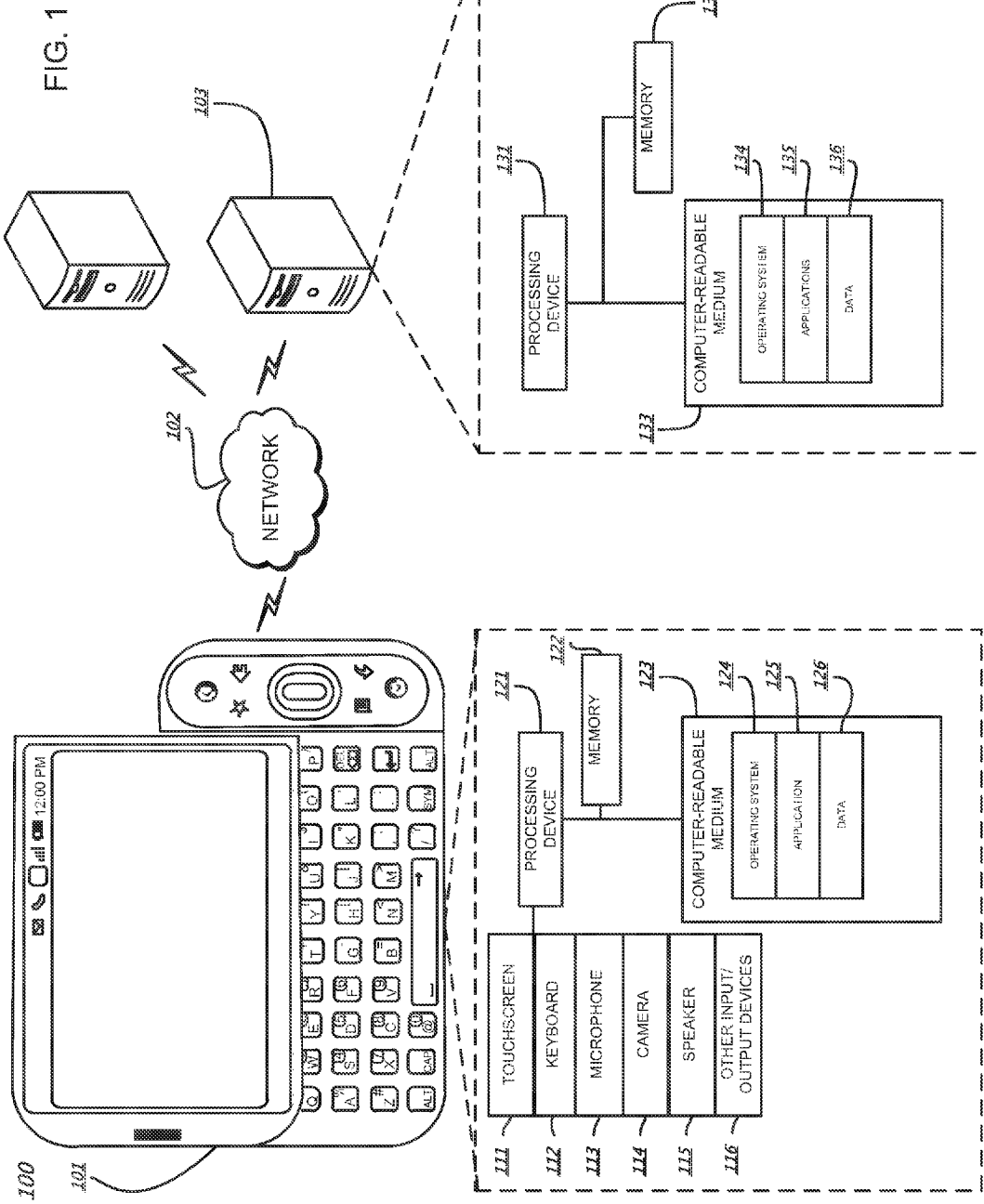

USER INTERFACE

BACKGROUND

The present application relates to a user interface ("UI").

The UI of a computing device enables a user to interact with computing device applications, and typically consists of a combination of one or more input and output devices coupled to the computing device, and software. A user may provide input to an application, for example, through the use of one or more hands-based input devices such as a mouse and keyboard, and the application may present information to the user through one or more output devices such as a monitor and speakers. An application may present information to a user visually, for example, through a graphical user interface ("GUI").

SUMMARY

In a first aspect, a method includes receiving a first input through a hands-based input device. A prompt is then output, and input responsive to the prompt may be received through either of a hands-based input device or a hands-free input device. Responsive to receiving a second input through a hands-free input device, a determination that the second input is responsive to the prompt may be made, an operation based on the second input may be performed, and cessation of the output of the prompt may occur.

In a second aspect, a multi-input UI may be configured to receive input through a mechanical hands-based input device such as a keyboard, or through a positional or pointing hands-based input device such as a touchscreen or mouse. The multi-input UI may be further configured to receive input through an audio hands-free input device such as a microphone, or through an imaging or video hands-free input device such as a digital camera.

In a third aspect, a multi-input UI may be configured to output a prompt that is a modal dialog. The prompt may indicate a suggested state of a computing device, and an operation performed in response to an input may be a transition to the suggested state. The prompt may, for example, indicate a suggested change to a document, and the operation may effect the change.

Other implementations of these aspects include corresponding systems, apparatus, and computer programs, configured to perform the actions of the methods, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 1 is a diagram of an example of a system featuring a computing device having a multi-input user interface.

Like reference symbols in the various drawings indicate like elements.

DETAILED DESCRIPTION

Figure 2A:
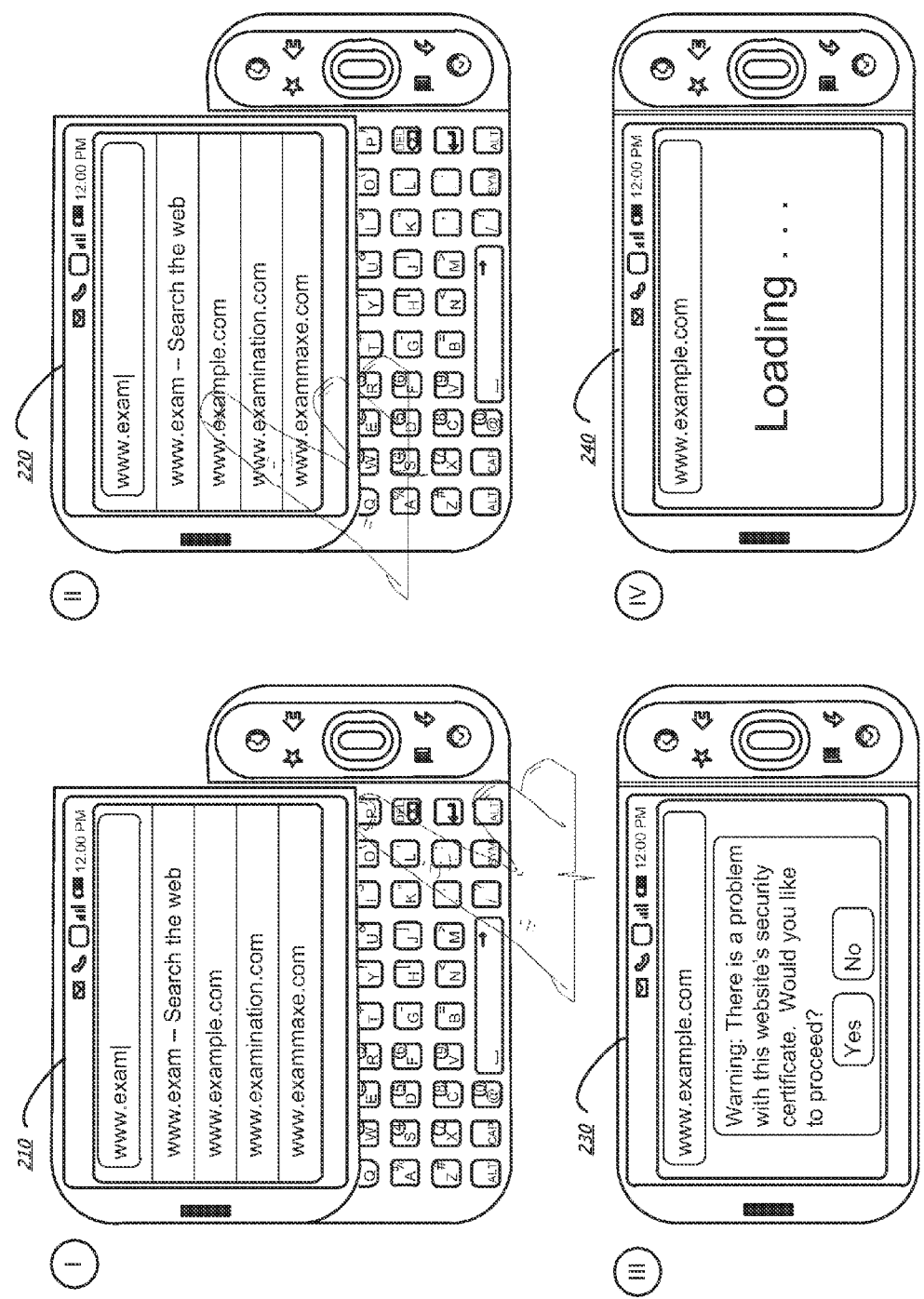
FIG. 2A is an illustration showing examples of a multi-input user interface.

In various implementations, a UI may allow for a combination of hands-based and hands-free input to enable a user to respond to a prompt for input, without interfering with the user's ability to continue to provide non-responsive input. For example, a multi-input UI may be configured to enable a user to provide input through a combination of hands-based input devices, such as pointing devices and keyboards, and hands-free input devices, such as cameras and microphones. The multi-input UI may be further configured, for example, to receive simultaneous input from a keyboard and from a microphone, thereby enabling a user to provide verbal input while typing.

The multi-input UI may be further configured to determine if an input received through either of a hands-based or hands-free input device is responsive to a prompt, and to perform an operation based on the determination. For example, a word processor application executing on a computing device may indicate a suggested change to a document while the user is typing. Because the multi-input UI in this example is configured to receive simultaneous input from hands-based and hands-free devices, and is further configured to determine that input received through a hands-free input device is responsive to a prompt, the user may continue to type while responding to the prompt through a hands-free device.

Implementations may include one or more of the following advantages. For example, a multi-input UI may eliminate reliance on hands-based input devices as a sole source of input. Exclusive reliance on hands-based input devices may, at times, frustrate users, as providing input through hands-based devices alone may be cumbersome and time-consuming. This is particularly true when multiple hands-based devices are involved or when a prompt for input interrupts the user's workflow. For example, an application may prompt a user to provide required input through a modal dialog window of a GUI, the modal dialog window preventing further input in a primary window until the required input is provided. To provide the required input through an exclusively hands-based GUI, the user may need to shift his or her attention away from a previously-focused on portion of the GUI, and may need to shift his or her hands from one hands-based input device to another. A multi-input UI, however, might enable the user to respond through a hands-free device, eliminating the need for the user to shift his or her attention, or to move his or her hands.

As another example, a multi-input UI may allow a user to provide hands-free and hands-based input simultaneously, and may further allow a user to respond to a prompt for input using a hands-free input device while providing non-responsive input using a hands-based input device. By contrast, a UI that requires exclusively hands-based responses may require a user to cease providing one non-responsive input in order to provide a different input that is responsive. For example, a word processor application executing on a computing device may indicate a suggested change to a document while a user is typing. If a response to the suggestion requires mouse or keyboard input, the user must cease typing to respond, interrupting workflow. A multi-input UI, however, might enable the user to respond to the suggestion through a hands-free device while continuing to type.

FIG. 1 is a diagram of an example of a system featuring a computing device having a multi-input user interface. In system 100, the computing device 101 is a mobile device having a touchscreen display 111 that is both an output device and a hands-based input device. The computing device 101 also features keyboard 112, a hands-based input device, and two hands-free input devices: microphone 113 and camera 114. The computing device 101 also includes speaker 115, an output device, and may include other input/output devices 116.

Computing device 101 may be, for example, a personal computer, a smartphone, or any other appropriate computer device. Generally speaking, a smartphone is a mobile device that offers advanced computing capabilities, such as the ability to execute applications and to communicate with other computing devices such as server 103. Computing device 101 and server 103 may be connected via network 102. Network 102 may include one or more networks, such as a local area network, a wide area network, and/or the Internet. One or more of the networks that make up network 102 may be wireless, such as a cellular telephone network or a Wi-Fi network.

Computing device 101 may include a computer-readable medium 123 for storing data 126 and computer programs such as operating system 124 and application 125. Computing device 101 may further include a processing device 121 (e.g., a microprocessor) and a memory 122 (e.g., RAM) for executing computer programs. Similarly, server 103 may include a computer-readable medium 133 for storing data 136, operating system 134, and applications 135, and may further include a processing device 131 and a memory 132.

Speaker 115 is an audio output device that functions as part of the multi-input UI provided by computing device 101. Touchscreen 111 is a visual output device that functions as part of the multi-input UI provided by computing device 101. Touchscreen 111 displays, to a user, information and images that are generated by computing device 101.

Touchscreen 111 is touch-sensitive, enabling a user to provide hands-based input by interacting with various regions of the screen. For example, a user may provide input via a virtual keyboard or by input regions defined by applications executing on the computing device 101, or by applications executing on other computing devices that are in communication with computing device 101, such as server 103. Additional hands-based input may be received through the physical QWERTY keyboard 112.

Computing device 101, and computer applications executed thereon, may also be configured to accept commands through hands-free input mechanisms, such as voice commands, and to perform functions in response to such commands. Microphone 113 is a hands-free input device through which speech or other sound-based input may be provided, and camera 114 is a hands-free input device through which gestures or other motion or image-based input may be provided.

Computing device 101 runs an operating system 124. Computer programs, including applications, are stored, for example, in computer-readable medium 123, and execute on top of the operating system 124. Among these computer programs is application 125, which may interface with other applications of the computing device. Application 125 may be, for example, a browser application, a gaming application, or a media application, and may feature a multi-input UI. The information involved in the processes described herein may be stored as data 126 on computer-readable medium 123 of the mobile device.

When executed on computing device 101, application 125 receives a first hands-based user input through one of touchscreen 111, keyboard 112, or another input device 116. The application 125 outputs a prompt through touchscreen 111, speaker 115, or another output device 116, and is configured to receive input responsive to the prompt through either of a hands-based user input device such as touchscreen 111 and keyboard 112, or a hands-free input device such as microphone 113 and camera 114.

The application 125 may be configured to determine that a second input received through a hands-free input device is responsive to the prompt. The nature of the responsive user input, for example, the gesture or sound used to effect the input, may be suggestive to the user of the response. For instance, the user may intuitively nod his or her head up and down to input a positive response to the prompt through camera 114, or may shake his or her head left and right to input a negative response. In another example, the user may say "yes" to input a positive response to the prompt through microphone 113, or may say "no" to input a negative response.

After receiving the second input, application 125 determines that the second input is responsive to the prompt, performs an operation based on the second input, and ceases to output the prompt. For example, the prompt may indicate a suggested state of the computing device 101, the second input may indicate a command to transition to the suggested state, and the application may perform an operation in responsive to receiving the second input that includes transitioning to the suggested state. For example, a word processor application running on a computing device may provide a prompt to a user indicating a suggested formatting change to a portion of text. In response to receiving an affirmative input through a hands-free input device, such as nod of the user's head captured by a camera, the word processor application may determine that the affirmative input is responsive to the prompt, and may then transition the computing device to the suggested state by performing the formatting change.

FIG. 2A is an illustration showing examples of a multi-input user interface. Specifically, FIG. 2A illustrates four example views, 210, 220, 230, and 240, that are displayed on computing device 101 during example states (I), (II), (III), and (IV), respectively. Together, these views provide an example of a multi-input UI in use. The example states (I), (II), (III), and (IV) may be time-sequenced states, or they may occur in a sequence that is different than the illustrated sequence.

In more detail, at state (I), depicted by view 210, application 125 receives a hands-based user input through keyboard 112 of computing device 101, while visually displaying information through touchscreen 111. In the depicted example, application 125 is a web browser program with a GUI, and the user is inputting a Uniform Resource Locator ("URL"). As the user inputs the URL using the keyboard 112 of the computing device 101, the application 125 outputs URLs of websites that are potential matches for the partially-input URL, and also displays an option to "Search the web" for potentially relevant websites. In the depicted example, "www.example.com," "www.examination.com," and "www.exammaxe.com" are each displayed, as each of these URLs is a potential completion of "www.exam." the partially-input URL provided by the user.

At state (II), depicted by view 220, application 125 receives an additional hands-based user input through touchscreen 111 of computing device 101. In the depicted example, the user has determined that "www.example.com" is the URL of a website of interest and, rather than completing the partial input using keyboard 112, the user has opted to select "www.example.com" using touchscreen 111. In response to receiving this additional user input, application 125 contacts the server 103 and begins to load the website indicated by the selected URL. However, the application 125 further determines that there is a problem with the website's security certificate.

At state (III), application 125 outputs a prompt to the user for further input. In the depicted example, the prompt is a modal dialog window. Application 125 displays the prompt on touchscreen 111, as depicted by view 230. While displaying the prompt, application 125 receives a hands-free user input through microphone 113 of computing device 101, the affirmative response "yes." Specifically, the user of the computing device 101 has spoken the word "yes" into microphone 113.

At state (IV), in response to receiving the hands-free user input, application 125 displays, on touchscreen 111, the result of beginning to perform an operation based on the hands free user input and ceasing to output the prompt. In the illustrated example, the application 125 determined that the hands-free input was an affirmative response to the prompt. Accordingly, the application 125 performs the operation of loading the website indicated by the selected URL.

Figure 2B:
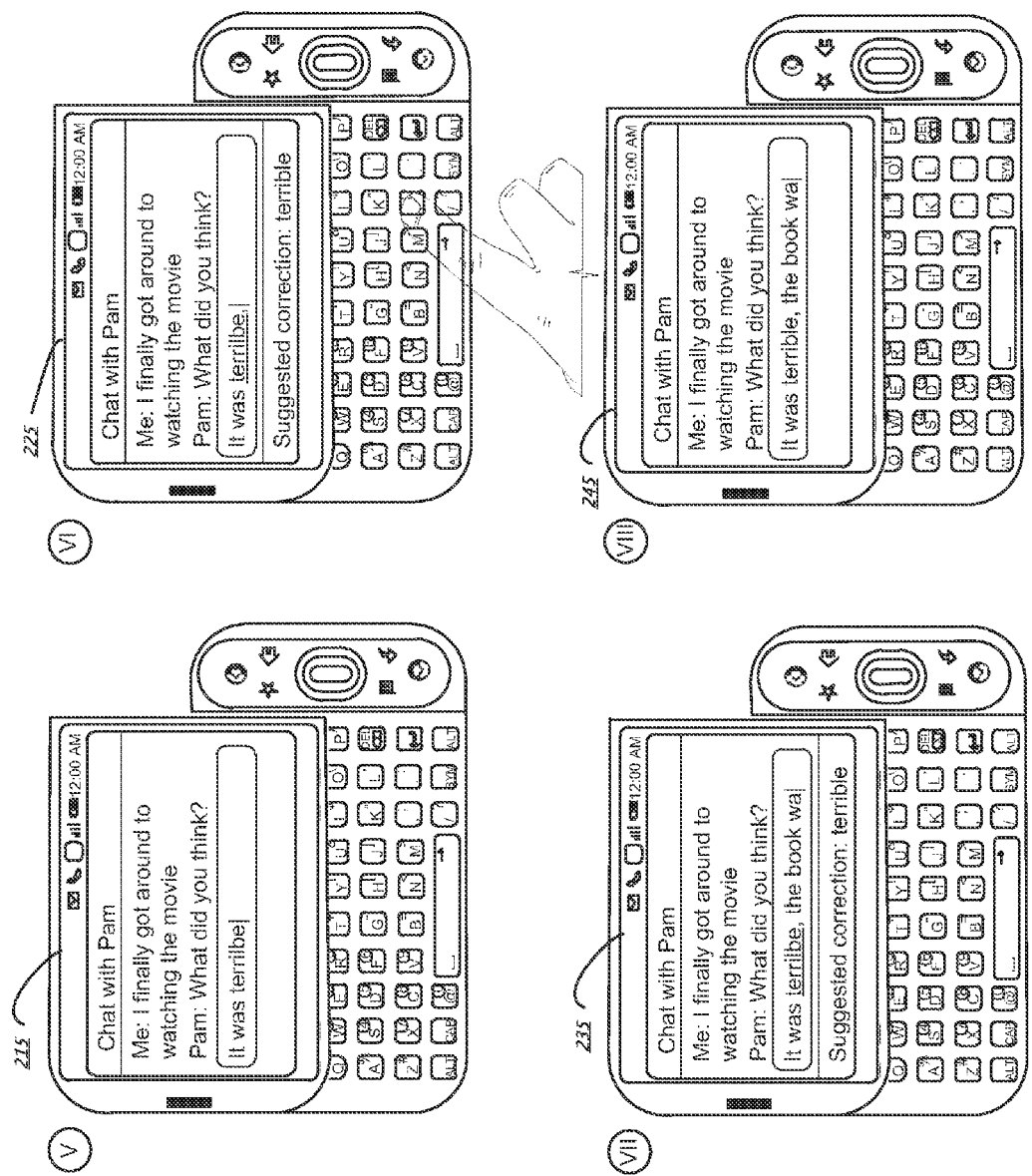
FIG. 2B is an illustration showing a multi-input user interface.

FIG. 2B is an illustration showing a multi-input user interface. Specifically, FIG. 2B illustrates four example views, 215, 225, 235, and 245, that are displayed on computing device 101 during example states (V), (VI), (VII), and (VIII), respectively. Together, these views provide an example of a multi-input UI in use. The example states (V), (VI), (VII), and (VIII) may be time-sequenced states, or they may occur in a sequence that is different than the illustrated sequence.

In more detail, at state (V), depicted by view 215, application 125 is visually displaying information through touchscreen 111. In the depicted example, application 125 is a chat program with a GUI, and the information displayed includes a line of text indicating that the user is chatting with "Pam," lines of text representing the last two messages that were exchanged ("Me: I finally got around to watching the movie" and "Pam: What did you think?"), and characters that have been previously input by the user as part of a partially-formed response to the last message, the characters forming the string "It was terrilbe".

At state (VI), depicted by view 225, application 125 has received a hands-based user input through keyboard 112 of computing device 101, the user input signaling the addition of a comma character to the end of the string. In response to the hands-based user input, application 125 determines that "terrilbe" is a misspelling of the word "terrible." As such, application 125 outputs a prompt to the user for further input. In the depicted example, the prompt is a suggested spelling correction.

At state (VII), application 125 displays the prompt on touchscreen 111, as depicted by view 235. Rather than responding to the prompt through hands-based input, for example by selecting the suggested spelling correction on touchscreen 111, the user has opted to respond through hands-free input. Specifically, the user has affirmatively responded to the prompt through microphone 113, by voicing "yes." Because the user has opted to respond to the prompt with hands-free input, the user's hands remain free for simultaneous hands-based input. As such, and as depicted, the user has input additional characters through keyboard 112. While displaying the prompt, application 125 receives the affirmative hands-free user input through microphone 113.

At state (VIII), in response to receiving the hands-free user input, application 125 determines that the hands-free user input is responsive to the prompt, performs an operation (the spelling correction indicated by the prompt) based on the hands-free user input, and ceases to output the prompt. Application 125 displays, on touchscreen 111, the result of performing the operation and ceasing to output the prompt. In the illustrated example, the application 125 determined that the hands-free input was an affirmative response to the spelling suggestion. Accordingly, the application 125 has performed the suggested spelling correction.

Figure 3:
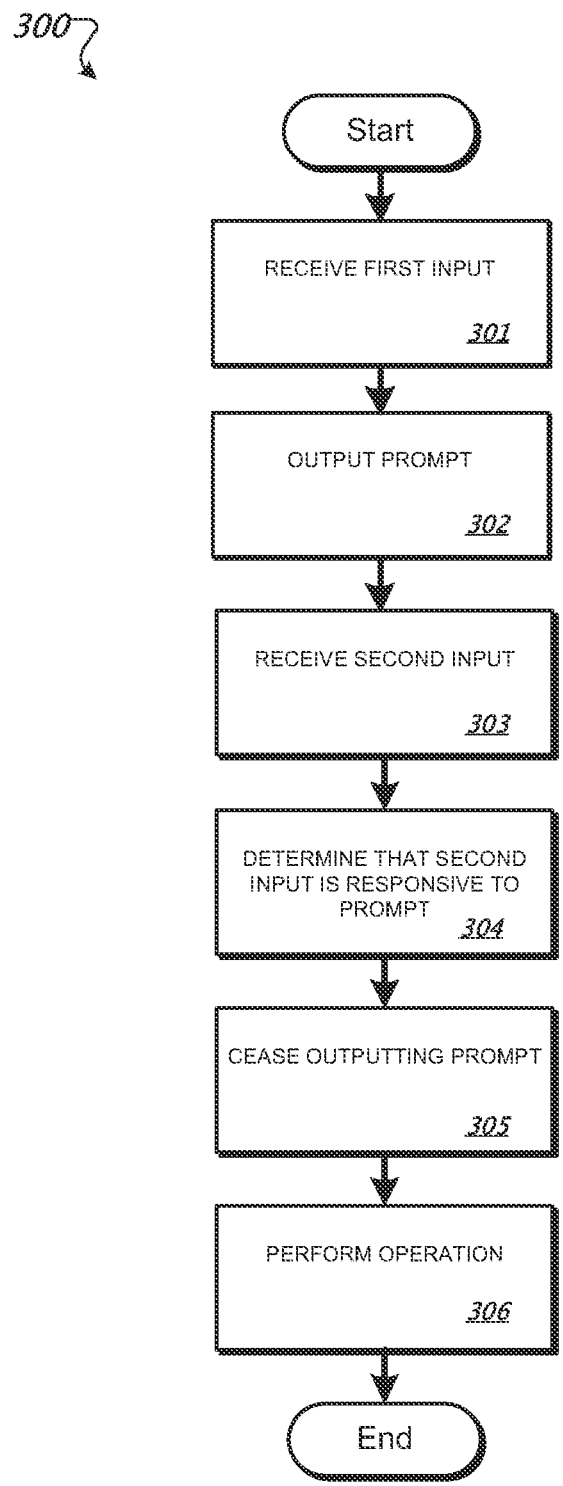
FIG. 3 is a flowchart of a process involving a multi-input user interface.

FIG. 3 is a flowchart of a process involving a multi-input user interface. The process 300 may be implemented, for example, using system 100. In such an implementation, one or more parts of the process may be executed by application 125, which may interface with any of the input and output devices of computing device 101, including touchscreen display 111, keyboard 112, microphone 113, camera 114, and speaker 115. Application 125 may be configured, for example, to receive simultaneous user inputs from both hands-based and hands-free input devices.

In an implementation involving system 100, application 125 may further interface with other applications of the computing device 101, or with applications accessible by the computing device 101 through network 102. Application 125 may retrieve information involved in the process from one or more local or remote data sources, such as computer-readable medium 123 of computing device 101.

Referring to FIG. 3, application 125 executing on computing device 101 receives a first input through a hands-based input device, such as touchscreen 111 or keyboard 112 (301). Application 125 may then output a prompt using one or more output devices, such as touchscreen 111 and speaker 115 (302). For example, in response to receiving the first input, application 125 may display an image or a modal or modeless dialog box using touchscreen 111, may output a tone using speaker 115, or may output a prompt using more than one output device.

Application 125 may be configured to receive input responsive to the prompt through either of a hands-based or a hands-free input device. For example, application 125 may be configured to receive responsive input through any of touchscreen 111, keyboard 112, microphone 113, or camera 114. In the present example, however, application 125 receives a second input through a hands-free input device (303). The second input may be, for example, a nod or a shake of the user's head captured by camera 114, or an affirmative or negative response voiced by the user and captured by microphone 113.

In response to receiving the second input, application 125 determines that the second input is responsive to the prompt (304). The determination may be based, for example, on the specific input device through which input was received, or on a characteristic of the input. Application 125 may be configured to determine, for example, that a user's nodding gesture captured by camera 114 is responsive to the prompt, but that a different type of gesture captured by the camera 114, and/or input received through keyboard 112 is not.

Application 125 may also, in response to receiving the second input, cease outputting the prompt (305). Application 125 may further perform, in response to receiving the second input, an operation based on the second input (306). Application 125 may, for example, be configured to differentiate between multiple types of input and to perform an operation based on the type of input received. For example, if the prompt indicates a binary decision, the operation performed may differ depending on whether the second input indicates an affirmative or a negative response. Alternately, if the prompt indicates more than two possible responses, the operation performed may differ depending on whether the second input matches one of the potential responses. For example, application 125 may be configured to recognize multiple voice commands, and the operation performed may correspond to a voice command input through microphone 113.

Figure 4:
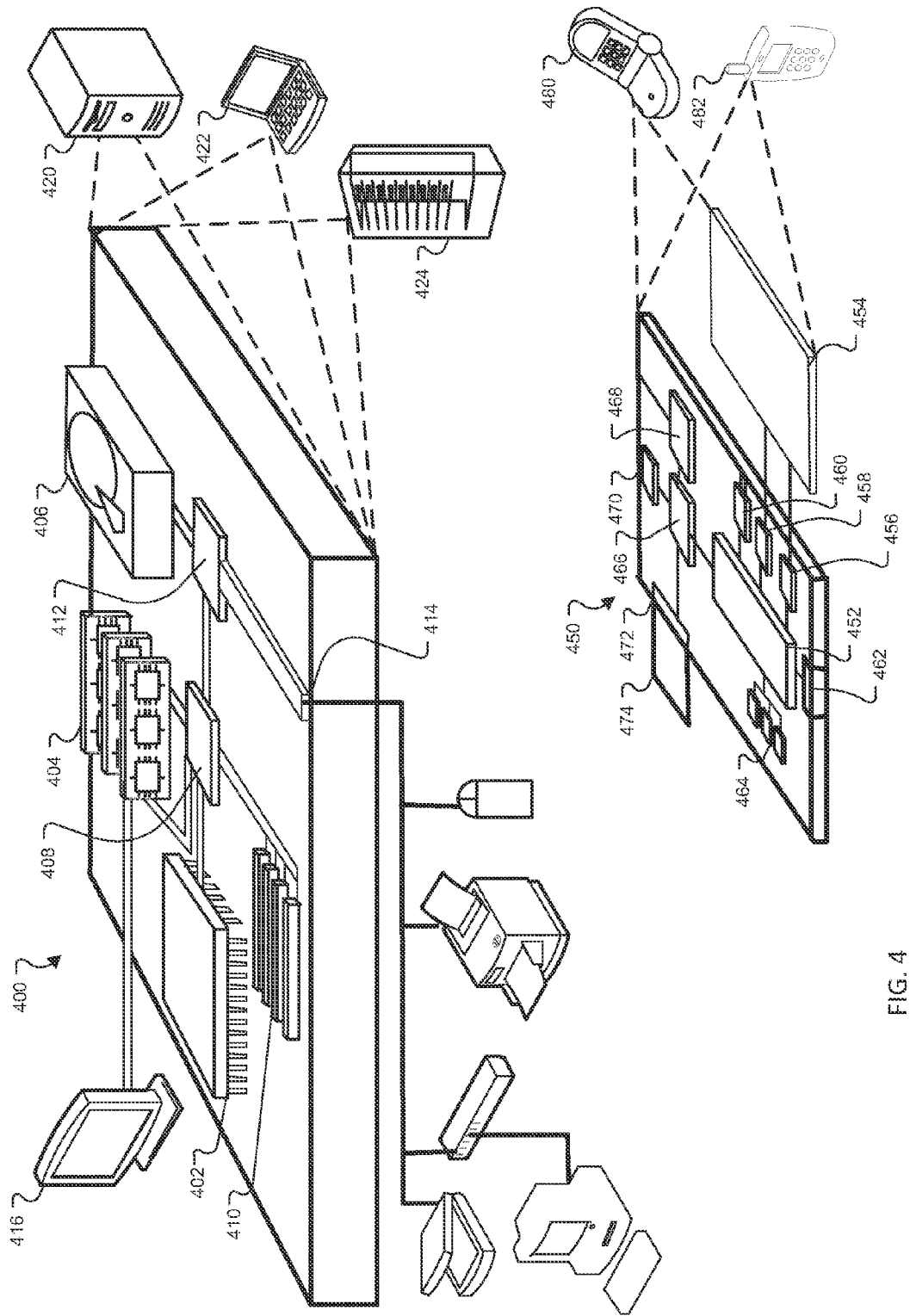
FIG. 4 shows examples of computing devices which may be used to provide a multi-input user interface.

FIG. 4 shows examples of computing devices which may be used to provide a multi-input user interface. Specifically, FIG. 4 shows an example of a generic computer device 400 and a generic mobile computer device 450, which may be used to implement the processes described herein. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 404, the storage device 406, memory on processor 402, or a propagated signal. For example, the information carrier may be a non-transitory, machine-readable storage medium.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a manner that is not modifiable by the end-user.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A computer-implemented method comprising:
   receiving, by a computing device, typed input from a keyboard operatively coupled to the computing device;
   outputting, by the computing device and while continuing to receive typed input from the keyboard, a prompt that requests user selection of an action to be performed by the computing device, wherein the typed input received while outputting the prompt is not responsive to the prompt;

receiving, by the computing device while outputting the prompt and while continuing to receive typed input from the keyboard, spoken input through a microphone operatively coupled to the computing device or visual input through a camera operatively coupled to the computing device;

determining whether the spoken input or the visual input, that was received while the prompt was being output and while typed input was continuing to be received, is responsive to the prompt; and in response to a determination that the spoken input or the visual input, that was received while the prompt was being output and while typed input was continuing to be received, is responsive to the prompt, performing, by the computing device, an action corresponding to the spoken input or the visual input and ceasing to output the prompt.

2. The computer-implemented method of claim 1, wherein:

the computing device comprises a mobile computing device that includes a touch-sensitive display, the keyboard is a virtual keyboard that is displayed on the touch-sensitive display, and outputting the prompt comprises displaying the prompt on the touch-sensitive display.

3. The computer-implemented method of claim 2, further comprising:

identifying a term in the typed input that is determined to be likely misspelled, wherein outputting the prompt that requests user selection of the action to be performed by the computing device comprises (i) displaying an indication that the identified term has been determined to be likely misspelled, and (ii) providing a suggested spell-corrected term to replace the identified term, and wherein determining whether the spoken input or the visual input is responsive to the prompt comprises determining whether the spoken input or the visual input indicates user selection of an action to replace the identified term with the spell-corrected term.

4. The computer-implemented method of claim 3, wherein the prompt, the virtual keyboard, and a text entry area that receives the typed input are concurrently displayed on the touch-sensitive display of the mobile computing device.

5. The computer-implemented method of claim 1, wherein the prompt identifies a particular action to be performed by the computing device, and wherein determining whether the spoken input or the visual input is responsive to the prompt comprises determining whether the user has provided one of (i) an affirmance for the computing device to perform the particular action, and (ii) a selection to not perform the particular action identified by the prompt.

6. The computer-implemented method of claim 5, wherein determining whether the user has provided one of (i) an affirmance for the computing device to perform the particular action, and (ii) a selection to not perform the particular action identified by the prompt comprises identifying, from the visual input, a nodding motion of a head or a shaking motion of the head, respectively.

7. The computer-implemented method of claim 1, wherein determining whether the visual input is responsive to the prompt comprises determining whether a head movement is one of a nodding gesture and a shaking gesture.

8. The computer-implemented method of claim 1, wherein determining whether the spoken input is responsive to the prompt comprises performing speech recognition on audio received through the microphone of the computing device.

9. The computer-implemented method of claim 1, further comprising providing the typed input to a particular application that is executing on the computing device, wherein outputting the prompt comprises generating the prompt by the particular application that is executing on the computing device.

10. The computer-implemented method of claim 1, wherein outputting the prompt does not interfere with receiving typed input through the keyboard of the computing device that is not responsive to the prompt.

11. One or more non-transitory computer-readable media having instructions stored thereon that, when executed by one or more computers, cause performance of operations comprising:

receiving, by the one or more computers, typed input from a keyboard operatively coupled to the one or more computers;

outputting, by the one or more computers and while continuing to receive typed input from the keyboard, a prompt that requests user selection of an action to be performed by the one or more computers, wherein the typed input received while outputting the prompt is not responsive to the prompt;

receiving, by the one or more computers while outputting the prompt and while continuing to receive typed input from the keyboard, spoken input through a microphone operatively coupled to the one or more computers or visual input through a camera operatively coupled to the one or more computers;

determining whether the spoken input or the visual input, that was received while the prompt was being output and while typed input was continuing to be received, is responsive to the prompt; and in response to a determination that the spoken input or the visual input, that was received while the prompt was being output and while typed input was continuing to be received, is responsive to the prompt, performing, by the one or more computers, an action corresponding to the spoken input or the visual input and ceasing to output the prompt.

12. The one or more non-transitory computer-readable media of claim 11, wherein:

the one or more computers comprises a mobile computing device that includes a touch-sensitive display, the keyboard is a virtual keyboard that is displayed on the touch-sensitive display, and outputting the prompt comprises displaying the prompt on the touch-sensitive display.

13. The one or more non-transitory computer-readable media of claim 12, wherein the operations further comprise:

identifying a term in the typed input that is determined to be likely misspelled, wherein outputting the prompt that requests user selection of the action to be performed by the one or more computers comprises (i) displaying an indication that the identified term has been determined to be likely misspelled, and (ii) providing a suggested spell-corrected term to replace the identified term, and wherein determining whether the spoken input or the visual input is responsive to the prompt comprises determining whether the spoken input or the visual input indicates user selection of an action to replace the identified term with the spell-corrected term.

14. The one or more non-transitory computer-readable media of claim 13, wherein the prompt, the virtual keyboard, and a text entry area that receives the typed input are concurrently displayed on the touch-sensitive display of the mobile computing device.

15. The one or more non-transitory computer-readable media of claim 11, wherein the prompt identifies a particular action to be performed by the one or more computers, and wherein determining whether the spoken input or the visual input is responsive to the prompt comprises determining whether the user has provided one of (i) an affirmance for the one or more computers to perform the particular action, and (ii) a selection to not perform the particular action identified by the prompt.

16. The one or more non-transitory computer-readable media of claim 15, wherein determining whether the user has provided one of (i) an affirmance for the one or more computers to perform the particular action, and (ii) a selection to not perform the particular action identified by the prompt comprises identifying, from the visual input, a nodding motion of a head or a shaking motion of the head, respectively.

17. The one or more non-transitory computer-readable media of claim 11, wherein determining whether the visual input is responsive to the prompt comprises determining whether a head movement is one of a nodding gesture and a shaking gesture.

18. The one or more non-transitory computer-readable media of claim 11, wherein determining whether the spoken input is responsive to the prompt comprises performing speech recognition on audio received through the microphone of the one or more computers.

19. The one or more non-transitory computer-readable media of claim 11, wherein the operations further comprise providing the typed input to a particular application that is executing on the one or more computers, wherein outputting the prompt comprises generating the prompt by the particular application that is executing on the one or more computers.

20. The one or more non-transitory computer-readable media of claim 11, wherein outputting the prompt does not interfere with receiving typed input through the keyboard of the one or more computers that is not responsive to the prompt.

21. A system comprising:
one or more computers; and
one or more non-transitory computer-readable media having instructions stored thereon that, when executed by the one or more computers, cause the one or more computers to perform operations comprising:
receiving, by the one or more computers, typed input from a keyboard operatively coupled to the one or more computers;
outputting, by the one or more computers and while continuing to receive typed input from the keyboard, a prompt that requests user selection of an action to be performed by the one or more computers, wherein the typed input received while outputting the prompt is not responsive to the prompt;
receiving, by the one or more computers while outputting the prompt and while continuing to receive typed input through the keyboard, spoken input through a microphone operatively coupled to the one or more computers or visual input through a camera operatively coupled to the one or more computers;
determining whether the spoken input or the visual input, that was received while the prompt was being output and while typed input was continuing to be received, is responsive to the prompt; and
in response to a determination that the spoken input or the visual input, that was received while the prompt was being output and while typed input was continuing to be received, is responsive to the prompt, performing, by the one or more computers, an action corresponding to the spoken input or the visual input and ceasing to output the prompt.

* * * * *